Aug. 23, 1960     J. E. THUROW     2,949,808
AERIAL GUNSIGHT

Filed July 3, 1956                                                   6 Sheets-Sheet 1

INVENTOR
James E. Thurow
BY E. W. Chisler
ATTORNEY

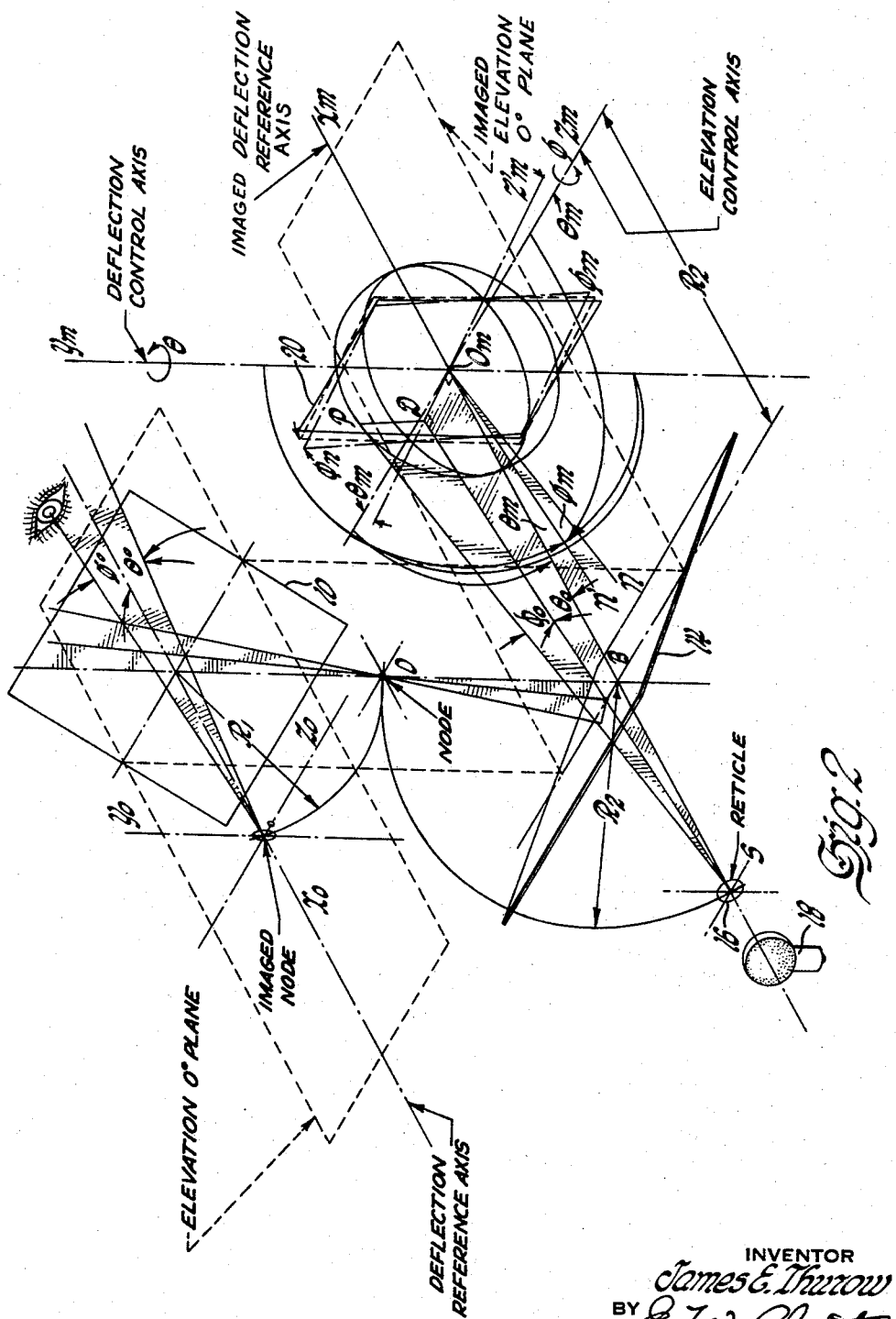

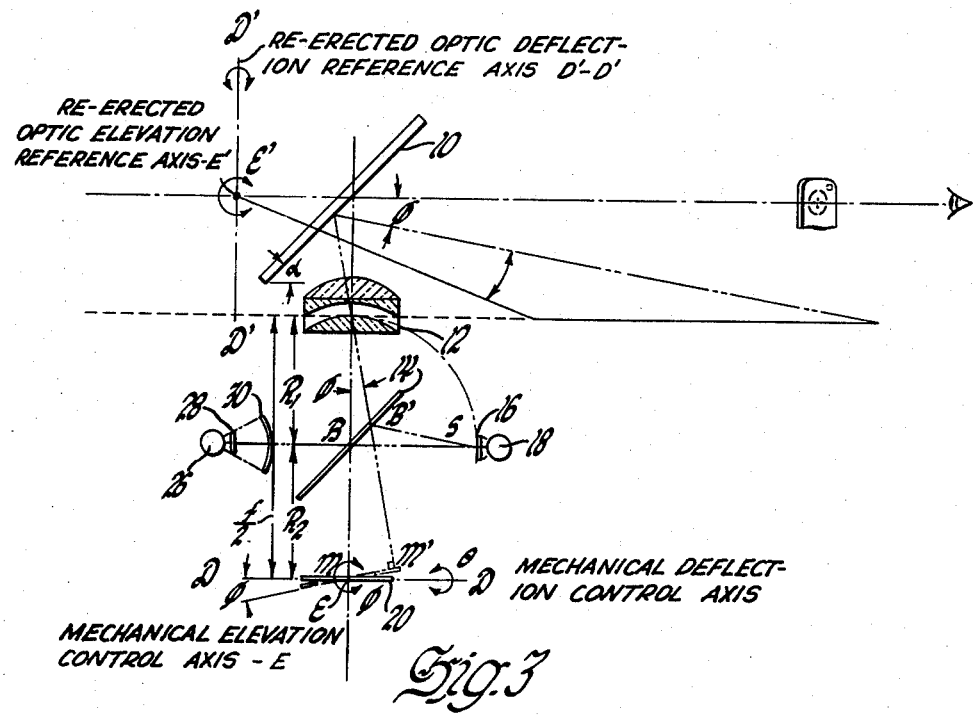
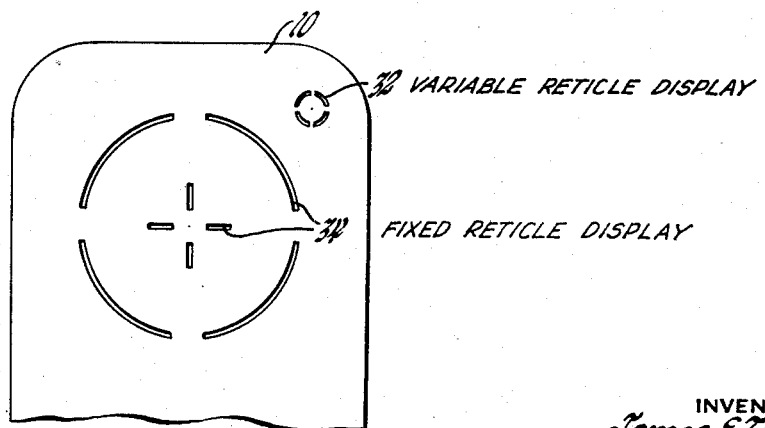

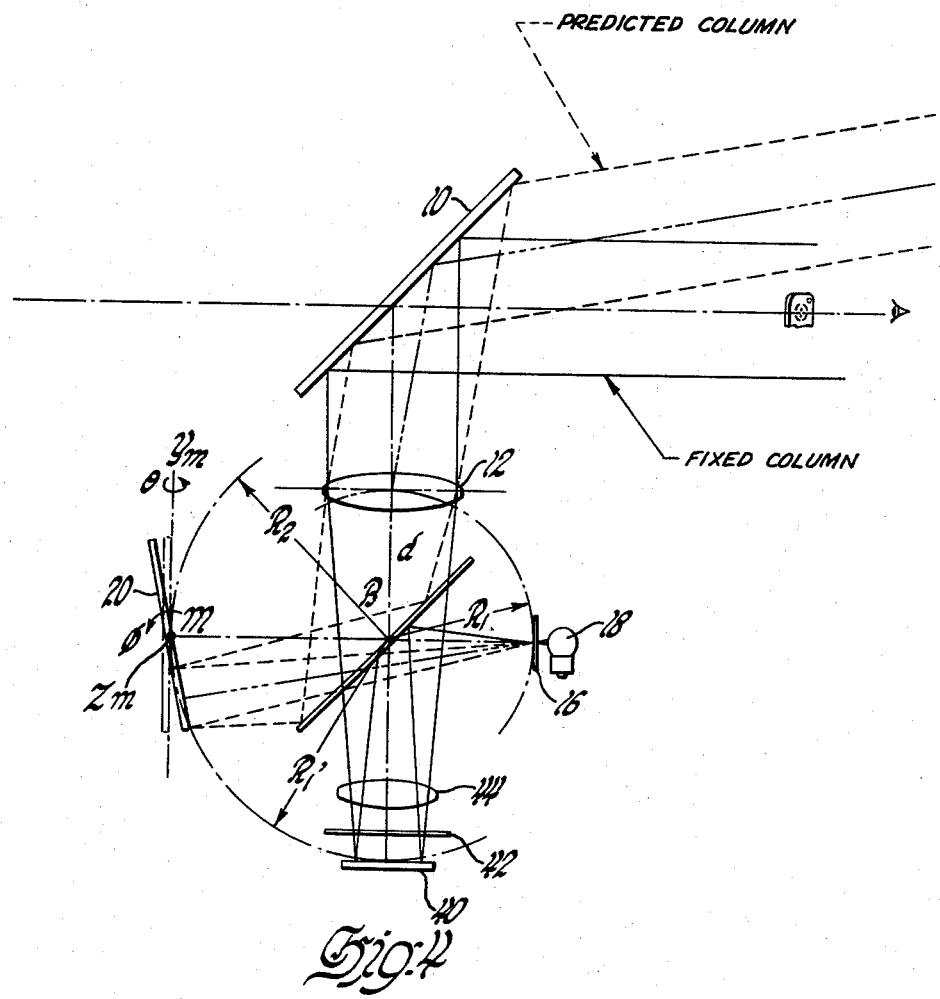

Aug. 23, 1960                J. E. THUROW                2,949,808
                             AERIAL GUNSIGHT
Filed July 3, 1956                                    6 Sheets-Sheet 5
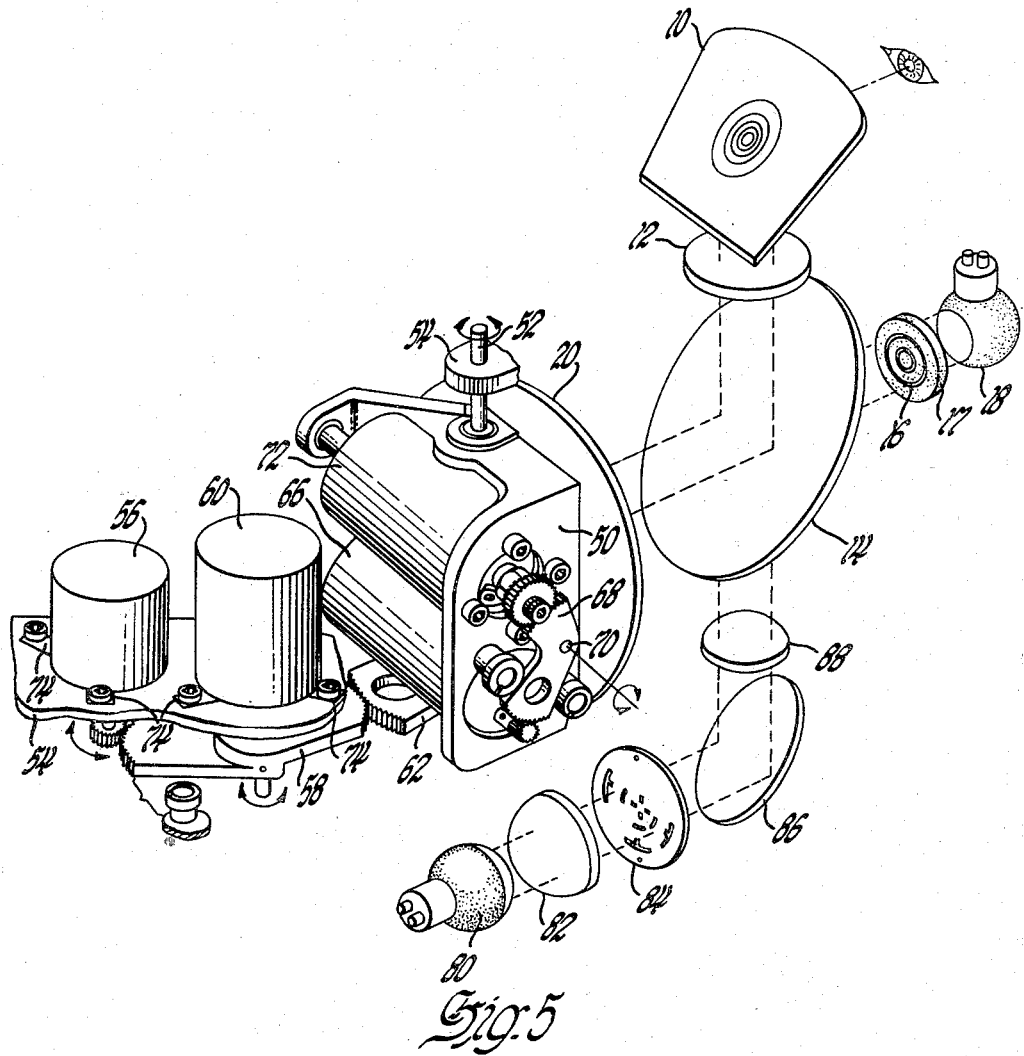
INVENTOR
James E. Thurow
BY E. W. Christen
ATTORNEY Aug. 23, 1960
J. E. THUROW
2,949,808
AERIAL GUNSIGHT
Filed July 3, 1956
6 Sheets-Sheet 6
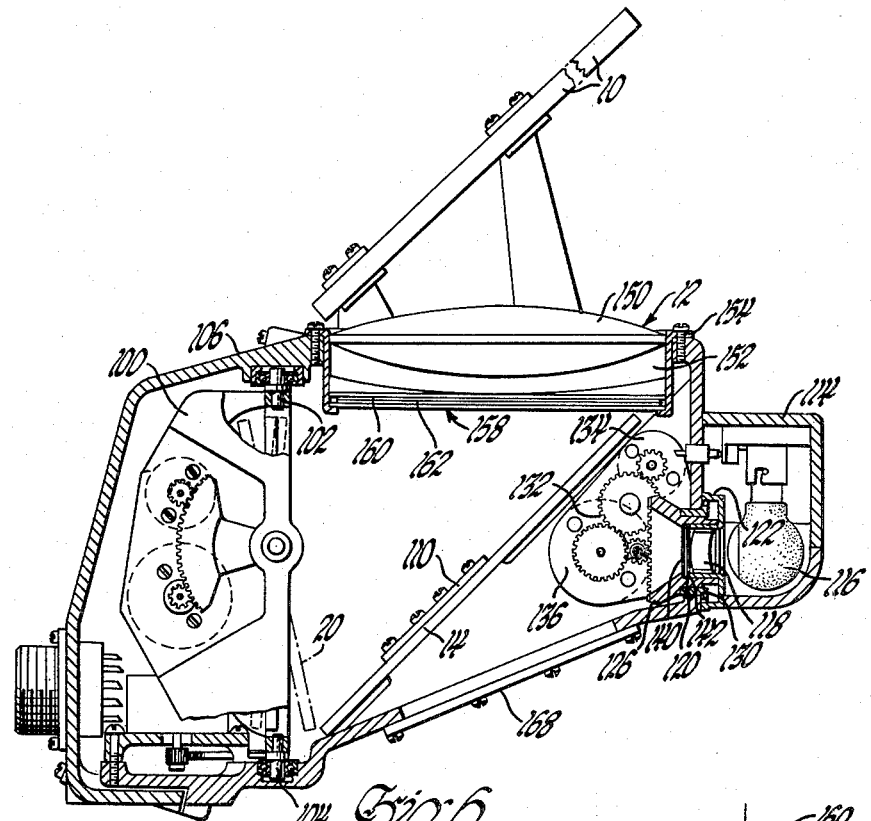
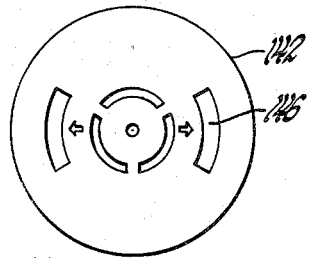
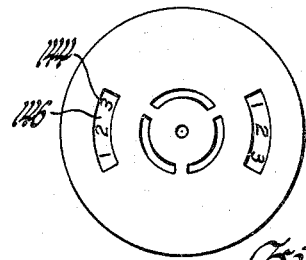
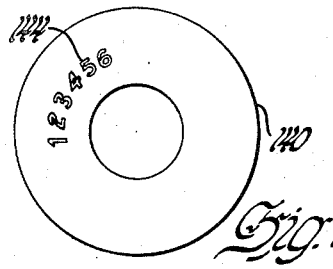
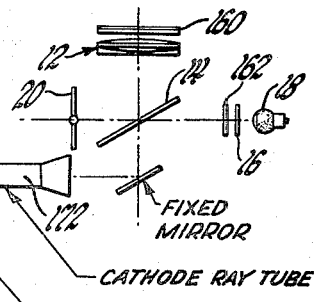
INVENTOR
James E. Thurow
BY E. W. Christen
ATTORNEY

United States Patent Office 2,949,808
Patented Aug. 23, 1960

2,949,808

AERIAL GUNSIGHT

James E. Thurow, Milwaukee, Wis., assignor to General Motors Corporation, Detroit, Mich., a corporation of Delaware Filed July 3, 1956, Ser. No. 596,132

13 Claims. (Cl. 88—1)

This invention relates to aerial gun sights or optical sight heads of the type employed in modern aircraft gunnery and bombing systems for target tracking purposes.

Such sight heads may provide one or more reticle patterns or indices which are projected and displayed in illuminated form reflected from a transparent combining glass or on the windshield of the aircraft in the direct view of the pilot. The reticle displays are produced by projecting illumination from one or more lamp sources upon the combining glass through one or more apertured masks, which provide the reticle patterns, and through a collimating lens or collimator assembly which is located below the combining glass and focuses the images of the reticle patterns at infinity.

The sight may be used in a fixed capacity in which a single tracking index, such as a dot, segmented circle or cross or any combination of such indicia, may be employed. The index may be caged or fixed in a central position in which position it may represent the direction of the craft fuselage reference line and/or gun line. By flying the craft to superimpose the index upon the target, the pilot can establish an optical sight or aim line to the target and thus optically track the target.

In order to use the sight head in a predicting capacity, it is necessary to have a reticle display that is movable in elevation and azimuth in accordance with the elevation and azimuth lead predicting angles which are generated by a suitable computer apparatus carried by the craft. For this purpose the sight head may contain suitable elevation and azimuth servo drive mechanisms, which are energized in accordance with the lead predicting angles derived from the computer and drive a suitable predicting element, such as a mirror, upon which the reticle image is projected and then reflected from the combining glass. In some systems the combining glass itself is employed as the movable predicting element. The pilot flies a lead pursuit or pure dive course tracking the target with the index, which is positioned in a lead predicting position by the lead computing apparatus, thus instrumenting the proper lead prediction angles into the gunnery or bombing system.

Such lead predicting sight heads may be characterized as being either of the divergent beam prediction variety or of the collimated beam prediction variety, depending upon whether the movable predicting element is located in the divergent beam of the optical system between the illuminated reticle mask and the collimating lens or is located in the collimated beam between the lens and the combining glass.

Among the objections to collimated beam prediction type sight heads are that they are generally of larger package size and weight, impose greater restrictions on eye freedom and require greater head movement on the part of the pilot to view the target than divergent beam prediction sight heads. Also, the optical systems of such collimated beam prediction sight heads are not well suited to provide certain functions as where a fixed reticle display is required in addition to a movable reticle display. This is particularly true when the combining glass itself is employed as the movable predicting element.

While true generally of divergent beam prediction sight heads, the optical systems of predicting sight heads heretofore employed, are characterized by optical dip or droop phenomena, resulting in non-linear correspondence of the optical prediction angles generated thereby to the prediction angles derived by the computer. It has been necessary to correct optical dip or droop by various mechanical and/or electrical compensation expedients as by simultaneous translation and rotation of the predicting element and/or by compensating cross-feed networks in the elevation and azimuth channels of the sight.

The present invention seeks generally to provide improvements in lead predicting or computing aerial gun sights and, more particularly, to provide a simple, unique optical design for a collimated sight head with the predicting element in the divergent beam.

The invention has for its principal object to provide a lead predicting type sight head of the above character which is a true spherical, coordinate, angular repeater and yields a spherical, coordinate angle presentation that is free of optical droop errors and does not need any electronic or mechanical compensation.

The above and other objects, together with the features and advantages of the present invention, will appear more fully from the following description and drawings in which:

Fig. 2 is a generalized isometric, schematic showing the basic geometric and trigonometric relationships of the components of a divergent beam prediction sight head in accordance with the present invention;

Fig. 3 is a schematic diagram of another optical system illustrating another modification of the present invention;

Fig. 3a is a form of reticle display mentioned in the description of Fig. 3;

Fig. 4 illustrates the interior of a form of sight head in accordance with the present invention;

Fig. 5 is an isometric view with parts broken away showing the mechanical organization of a form of sight head in accordance with the present invention;

Fig. 6 is a sectional view with parts broken away of another form of sight head in accordance with the present invention;

Figs. 7, 7a and 7b illustrate a reticle assembly and form of reticle display employed in the sight head of Fig. 6; and Fig. 8 is a diagrammatic illustration of a radar controlled cathode ray system integrated in an optical sight head according to the present invention.

Figure 1:
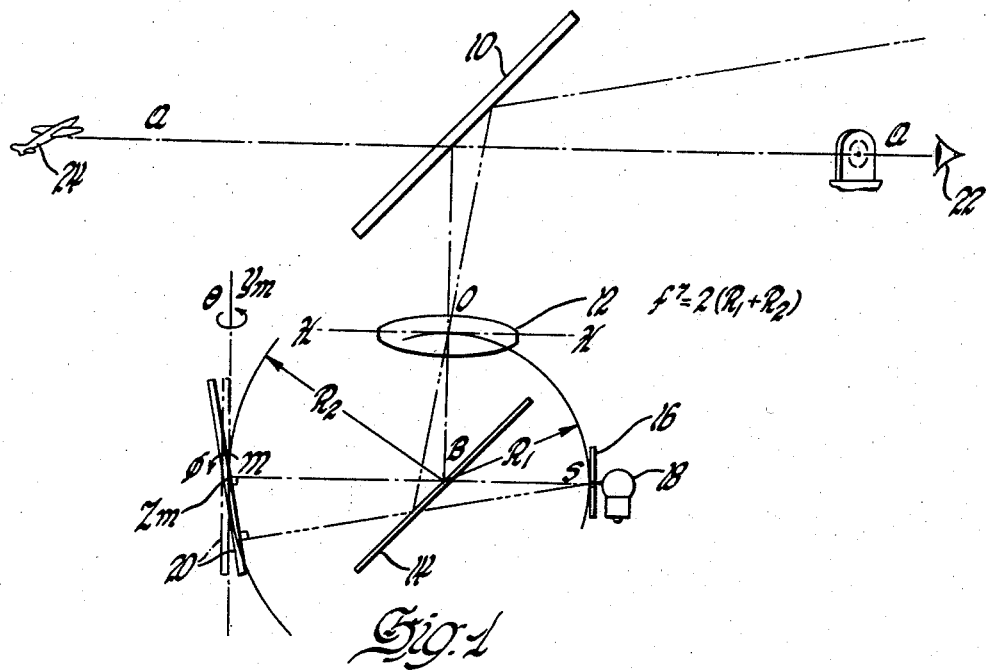
Fig. 1 is a diagrammatic illustration of an optical design for an ocular and spherically quadrate divergent beam prediction system in accordance with the present invention.

Referring to the drawings, the basic optical system of the sight head of the present invention is shown in Fig. 1 which includes a transparent combining glass 10, a collimating lens 12, a partially reflecting mirror or beam splitter 14, a reticle 16 and electric lamp 18, and a predicting mirror 20.

Figure 1A:
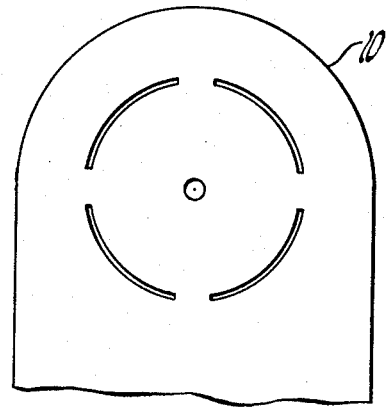
Fig. 1a is a form of reticle display mentioned in the description of Fig. 1.

The combining glass 10 is inclined to the sighting plane A—A, shown here as being disposed in the horizontal or 0 degree elevation plane, and is interposed between the eye of the pilot indicated at 22 and the target 24. The collimator could be a single element convergent lens 12, which is located below the combining glass and has its primary nodal point, denoted at 0, contained in the nodal plane designated H—H. The semi-transparent beam splitter 14 is located below the collimating lens and is inclined to the optical center line or control axis of the system, which passes through the lens node. The mask or reticle 16 is displaced laterally from the lower side or surface of the beam splitter and may be an opaque plate or element that is apertured or has a translucent portion that is shaped to produce any desired display pattern such, for example, as a segmented circle and a central pip or dot shown in Fig. 1a. The reticle is illuminated from the electric lamp 18, light rays from which are projected through the apertured or translucent portion of the reticle element in a divergent light beam upon the lower face of the partially silvered beam splitter.

The prediction mirror 20 may be laterally spaced from the side of the beam splitter opposite the reticle and lamp assembly, as in the arrangement shown in Fig. 1 in which an illuminated reticle pattern is projected upon the prediction mirror by the light rays from the lamp that are transmitted through the reticle and the beam splitter. The prediction mirror is gimbaled for rotational movement about an Azimuth or Deflection control axis $Y_M$ and about an orthogonally related elevation control axis $Z_M$ perpendicular to the plane of the paper. Movement of the prediction mirror about these axes is accomplished by elevation and azimuth servo drive motors in the sight head controlled from the fire control computer apparatus, which is carried by the craft and determines or predicts the exact amount the pilot must lead the craft or guns in order to hit the target.

The prediction mirror is located in the path of the divergent light beam from the lamp source and directs the image of the reticle pattern upon the upper face of the beam splitter where it is reflected upwardly through the collimating lens. The lens collimates the image of the reticle pattern, focusing it at infinity, and projects it upon the combining glass where it will be seen when the pilot views the target or the predicted location thereof. The reticle image pattern reflected by the predicting mirror will be movable in elevation and azimuth upon the combining glass in accordance with the elevation and azimuth lead predicting angles set into the prediction mirror by the computer system.

Where the target is visible and the pilot may optically track the target, the pilot directs the craft along a lead pursuit course to superimpose the lead predicting reticle display on the target and fires the guns or operates the bomb release mechanism when the craft is within range of the target.

In accordance with the present invention, the reticle 16 is so located with respect to the collimating lens 12 and the beam splitter 14 that the reticle center will be coincident with or superimposed upon the virtual image of the primary nodal point of the lens. Also, the predicting mirror is so oriented and gimbaled that an undeviated ray from the lamp, considered as a point source in the plane of the reticle, is always reflected coincidentally back upon itself and passes through an angular node of the system, which in this case is the primary nodal point of the collimating lens.

Physically, the center of the reticle is so located with respect to the collimating lens and the beam splitter that the beam splitter bisects the included angle formed between the plane of the primary lens node and the plane of the reticle. Thus, the distance from the primary lens node 0, measured along the optical center line or optical control axis of the system, to the point B on the beam splitter, considered as a pellicle or thin membrane, is the same as the distance measured from the point B to the point S at the reticle center. The primary node and the reticle center thus are symmetrically located with respect to the beam splitter and are equally displaced from the center thereof, as indicated by the radius vector $R_1$. The combining glass is shown as being inclined to the sighting or reference plane A—A and the optical center line of the system.

The predicting mirror is shown with its center M displaced from the center of the beam splitter by the distance BM or the radius vector $R_2$ and is so located that at zero prediction angle generation it (1) will lie in a plane containing the deflection and the elevation control axes or in a plane parallel to the coordinate reference frame containing these axes and (2) is perpendicular to the optical control axis of the system or to the direction of the line SM in the illustrated configuration.

The above configuration of lens and reticle with respect to the beam splitter and the orientation of the prediction mirror results in an optical system free of optical droop errors which are inherent in the design of prior forms of divergent beam prediction sight heads as will be shown below.

In accordance with the rule governing the reflection by a plane reflecting surface of a divergent homocentric pencil of light rays from a point source, the above configuration will cause a virtual image of the reticle pattern center to be erected coincidentally on the nodal point of the lens by the beam splitter, and, conversely, a virtual image of the lens node will be erected coincidentally on the center of the reticle pattern by the beam splitter. The combining glass bisects the included angle between the sighting or reference plane and the optical center line passing through the lens node and produces a virtual image of the lens node behind itself in the sighting or reference plane, as indicated in Fig. 4.

By the same principle, the predicting mirror, which is also a reflecting surface, symmetrically re-erects a virtual image of the reticle center and of the superimposed lens node at a distance equal to $R_1+R_2$ behind itself. The image of the reticle pattern erected behind the predicting mirror thus will be located a distance equal to twice the total radius vector or $2(R_1+R_2)$ from the reticle center and the superimposed lens node and may be viewed in a collimated beam from above the collimating lens.

Under the familiar lens law, $1/S_0+1S_1=1/f$, an erect and virtual image of the reticle pattern erected by the predicting mirror will be seen at a distance $S_1$ behind or above the lens, provided that the effective focal length $f$ of the convergent lens is greater than or equal to the object distance $S_0$, which in this case may be taken to be $2(R_1+R_2)$. When the focal length of the lens is equal to the distance $S_0$, the above image will appear to be located at infinity, corresponding to the condition for the complete collimation.

If the center of rotation of the prediction mirror is in the plane of the mirror, the locus of the virtual reticle image generated by the prediction mirror as it is rotated in elevation and azimuth will be a sphere of radius $R_1+R_2$ or diameter $2(R_1+R_2)$. In order to match the field curvature of the locus of the virtual image erected by the prediction mirror, the field or radius of curvature of the lens ought to be $f/2$, where $f=S_0$ or $2(R_1+R_2)$.

If the field curvature of a given collimating lens departs from the above relation, the pivot of the prediction mirror may be located behind of or in advance of the surface of the mirror. In such case the locus of the virtual reticle image erected by the prediction mirror will no longer be a sphere, but a limacon. Thus, by translating the pivot of the mirror in advance of or behind the mirror such an amount, an effective portion of the generated locus of the virtual image may be matched with the field curvature of the lens. Locating the mirror pivot behind the mirror enables the provision of a relatively small gimbal package, as will appear from Fig. 5 and contributes to the dynamic and static balance of the components associated with the prediction mirror.

In the case of a perfect collimating lens, all rays emitted from a point will emerge from the lens parallel to the undeviated ray. Since the optical system of the present invention is such that an undeviated ray is always reflected coincidentally back upon itself regardless of the orientation of the prediction mirror, and since the lens node is superimposed on the reticle center, the undeviated ray will always pass through an angular node of the system. In order to investigate the angular position of a point imaged at infinity by a collimating lens with respect to some reference line in space through the lens node, it is only necessary to investigate the angular position of the ray from the object point to the lens node in the object space.

For this purpose, reference is made to Fig. 2 and the following geometric and trigonometric proof that the above described system is a spherical coordinate angular repeater that is not in need of electronic or mechanical corrective devices. In Fig. 2 the combining glass, the beam splitter and the mechanical deflection and elevation control axes of the prediction mirror are geometrically oriented in accordance with the present invention in order that the coordinate reference frame of the ocular system prediction angle presentation will be parallel to the coordinate reference frame of computation. In the development of the proof, the following assumptions will be made:

A. All azimuthal angles are measured in the elevation 0 degree plane $X_0Z_0$ from the deflection reference $X_0$ to the vertical circle passing through the target object or predicted point in space.
B. The combining glass 10 and beam splitter 14 make such an angle with respect to each other and the plane containing the reticle 16 that:
   a. The imaged deflection reference axis $X_M$ pierces the center of the reticle pattern 16;
   b. The imaged deflection reference axis $X_M$ pierces the intersection $O_M$ of the deflection control axis $Y_M$ and the elevation control axis $Z_M$; and
   c. The imaged elevation 0 degree plane $X_MY_M$ contains the imaged deflection reference axis $X_M$.
C. All elevation angles are measured from the elevation 0 degree plane $X_0Z_0$ in the plane containing the vertical circle to the radius vector to the target object or predicted point.
D. The deflection control axis $Y_M$ is oriented perpendicular to the imaged elevation 0 degree plane $X_MZ_M$, and the mechanical input angles of deflection are measured from the imaged deflection reference axis $X_M$.
E. The elevation control axis $Z_N$ lies in the imaged elevation 0 degree plane $X_MZ_M$ and rotates about the deflection control axis $Y_M$ in the imaged elevation 0 degree plane in deflection, but the deflection control axis $Y_M$ does not rotate about the elevation control axis $Z_M$ in elevation.
F. The plane of the predicting mirror 20 lies in the plane containing the elevation and deflection control axis $Y_MZ_M$ and is perpendicular to the imaged deflection reference axis $X_M$ at zero prediction angle generation.
G. The predicting mirror 20 is attached to the mechanical elevation axis and rotates about the elevation control axis $Z_M$ in elevation. The mechanical elevation axis and the deflection axis are coincident with the elevation control axis $Z_M$ and deflection control axis $Y_M$.

Now, the following statements will be evident from the examination of Fig. 2:

(1) Line $SO_M$ is perpendicular to the plane of the predicting mirror 20 when there is no prediction angle generation, and is the axis of the homocentric pencil of light rays from point source S to the denoted node at zero prediction angle generation.

(2) Line SD is perpendicular to the plane of the predicting mirror when the mirror is rotated about $Y_M$ in deflection some angle $\theta_M$ and is the axis of the homocentric pencil of light rays from point source S to the node at a generated deflection prediction angle.

(3) Line SP is perpendicular to the plane of the predicting mirror when the mirror is rotated in elevation about the $Z_M$ axis some angle $\phi_M$ and is the axis of the homocentric pencil of light rays from point source S to the node at a resultant prediction angle.

(4) Line $O_MN$ is a normal to the plane of the predicting mirror at $O_M$ which is the point intersection of the elevation and deflection control axes.

(5) Now, since SD and $O_MN'$ are perpendicular to the plane of the predicting mirror, they are also parallel.

(6) Therefore, $$\theta_M = \theta_0$$

because when two parallel lines are cut by a transversal the alternate interior angles so formed are equal.

(7) Since SP and $O_MN$ are perpendicular to the plane of the predicting mirror, they are also parallel.

(8) Therefore, angle $PSO_M = SO_MN$, because when two parallel lines are cut by a transversal the alternate interior angles so formed are equal.

(9) Since in deflection prediction angle generation only, the normal to the predicting mirror always lies in the imaged elevation 0 degree plane, then the angles $\theta_M$ and $\theta_0$ must always lie in the said plane also.

(10) Since the normal to the plane of the predicting mirror at $O_M$ is always normal to the elevation control axis, the plane containing the normal and the deflection control axis is always normal to the imaged elevation 0 degree plane, because rotational angles are always measured in a plane perpendicular to the axis of rotation.

(11) Since SP is parallel to $O_MN$ and SD is parallel to $O_MN'$ the plane containing the lines DS and SP must be parallel to the plane containing the lines $O_MN'$ and $O_MN$. Therefore the angles $\phi_0$ and $\phi_M$ are measured in parallel planes from the same plane.

(12) Now, the line intersection S of the planes containing $SO_M$—$O_MN'$, $SO_M$—$O_MN$, and $O_MN'$—$O_MN$, respectively, and a unit sphere whose center is coincident with $O_M$, form a right spherical triangle. Therefore, from spherical geometry considerations:

$$\cos(\angle SO_MN) = \cos \theta_M \cos \phi_M$$

or $$\cos \phi_M = \frac{\cos (\angle SO_MN)}{\cos \theta_M}$$

Similarly:

$$\cos \phi_0 = \frac{\cos (\angle PSO_M)}{\cos \theta_0}$$

But:

$$\theta_M = \theta_0$$

And:

$$\angle PSO_M = \angle SO_MN$$

Therefore:

$$\phi_M = \phi_0$$

Therefore, if a lens whose effective focal length is equal to or greater than $2R_2$ plus $2R_1$ is placed so that its primary principal point is coincident with the node, the system is a true repeater of spherical angular coordinates.

If the eye is placed at the denoted node, the system, without the use of any lens, is also a true repeater of spherical angular coordinates, without introducing parallax errors.

In view of the demonstrated equality of the output and input elevation and deflection prediction angles, $\theta_M = \theta_0$ and $\phi_M = \phi_0$, the optical prediction angles generated by the sight head will bear a linear one-to-one correspondence to the angular displacements of the predicting mirror by the elevation and azimuth servo drive energized from the computer.

Figure 3 is a schematic diagram of an optical system in accordance with the present invention that provides both a fixed reticle display and a variable reticle display. The prediction mirror 20 is shown located directly below the beam splitter at a distance $R_2$ therefrom. A fixed reticle assembly, which includes a lamp 26, reticle 28 and focusing lens 30, is shown located on the side of the beam splitter opposite the variable reticle assembly 16, 18. The center of the variable reticle and the lens node are equally spaced from the center of the beam splitter by the radius vector $R_1$, and the effective focal length of the lens is $2(R_1+R_2)$. It is apparent that the location of the fixed reticle assembly and the predicting mirror could be reversed. The variable reticle display may take the form of a small segmented circle 32, which is movable on the combining glass 10 in elevation and azimuth, while the fixed display 34 may consist of a larger segmented circle and central cross and pipper, as illustrated in Fig. 3a.

Such a combination of fixed and variable displays can be employed, for example, to establish a radar controlled pseudo-sight line to the target when the target is obscured, as at night or under adverse weather flying conditions. In such case, the target is located with the radar search beam, which locks on the target when the target is located. The radar apparatus applies a signal or signals to the elevation and azimuth channels of the sight head to displace the movable reticle in accordance with the position of the radar located target. The pilot then directs the craft along a collision course to superimpose the variable reticle upon the fixed reticle display to establish an aim or track line to the target.

The predicting mirror 20 in Fig. 3 is rotated about the mechanical deflection axis designated as D—D and about a mechanical elevation axis E, which is perpendicular to the plane of the paper. As in Fig. 1 the primary lens node of the collimating lens, which is shown herein as a multiple element assembly, is superimposed upon the center of the reticle 16 by the action of the beam splitter 14 so that an undeviated ray of the system will always pass through an angular node of the system located in the principal plane of the lens. The combining glass 10 re-erects behind itself an angular node from the principal plane of the lens, thus locating the optic deflection reference axis D'—D' and the optic elevation reference axis E', which is perpendicular to the plane of the paper.

With the prediction mirror 20 in its zero degree elevation prediction position, the undeviated ray from the variable reticle assembly will trace a path along the lines S—B and B—M and will be coincidentally reflected by the mirror along the same path. Part of the returning ray will be transmitted through the beam splitter 14 and pass through the primary nodal point of the lens. Where the prediction mirror is rotated in elevation by the angle $\phi$, the undeviated ray will follow and retrace the path traced by the lines S—B' and B'—M' with part of the returning ray passing through the beam splitter and through the primary nodal point of the lens. A similar action takes place when the predicting mirror is rotated in deflection about the axis D—D. Thus the conditions earlier specified herein are satisfied and the system of Fig. 3 will also be a true spherical angle repeater.

Fig. 4 is another optical system similar to that of Fig. 1, showing an arrangement for obtaining a fixed virtual image and a predicting virtual image with only one light source and one reticle pattern. The prediction mirror 20 is laterally displaced from the center of the beam splitter 14 (Fig. 4) by the radius vector $R_2$ and is located on the side of the beam splitter opposite the reticle assembly. A fixed mirror 40 and a focusing lens 44 and/or color filter 42 are located below the beam splitter at a distance equal to the radius vector $R_1'$, which, in the absence of the lens 44, is equal to $R_2$. In the presence of the lens 44, the foreshortening of the geometric path of the rays due to the action of the lens should be considered in locating the fixed mirror so that the distance $R_1'$ effectively will correspond to $R_2$. The beam splitter, as in the other optical systems described herein, is so located as to superimpose the lens node upon the reticle center and be equidistant from the lens node and reticle center as indicated by the radius vector $R_1$. The prediction mirror is so oriented and gimbaled that an undeviated ray from the reticle assembly always will be reflected coincidentally back upon itself and will pass through an angular node of the system.

The movable or variable reticle display is produced by the light rays transmitted through the beam splitter upon the movable prediction mirror. The mirror reflects these rays back upon the upper surface of the beam splitter which further reflects a portion of these light rays upwardly through the lens and upon the combining glass. As the prediction mirror is moved in elevation and azimuth, the reticle display on the combining glass will move accordingly.

The fixed reticle display is produced by the light rays from the illuminated reticle that are reflected downwardly from the reflecting surface of the beam splitter and are directed upon the fixed mirror 40 which reflects these rays upwardly through the beam splitter and lens and upon the combining glass. The use of the colored filter 42 aids in identifying the two reticle patterns.

Fig. 5 illustrates the internal mechanization of a form of sight head in accordance with the present invention in which the center of rotation of the prediction mirror is displaced behind the plane of the mirror. Such an arrangement, as mentioned hereinbefore, causes the predicting mirror to generate a virtual reticle image whose locus is a limacon, and enables a control variable to match the curvature of the virtual generated reticle surface with a given collimating lens field curvature. It also enables the use of a relatively small gimbal package, which need not frame the mirror as where the rotational axes are in the plane of the mirror, and also contributes to the dynamic and static balance of the mirror, gimbal and drive assembly.

The prediction mirror shown at 20 is displaced from the forward or right-hand end of the gimbal frame 50, which is provided at its upper and lower portions with a pair of vertically disposed stub pivot shafts, one of which is shown at 52 journaled at its lower end in the gimbal and rigidly fastened at its upper end to a portion of the sight head housing, shown diagrammatically at 54. The prediction mirror and gimbal 50 are driven in azimuth or deflection through an azimuth servo drive motor 56 which may be mounted on the floor or a bottom wall of the sight head housing 54 and drives a sector gear 58 fastened to the rotor of a synchro transformer 60. Gear 58 meshes with a sector gear 62 rigidly secured to the lower pivot shaft (not shown), which is journaled at its lower end in the sight head housing and is rigidly mounted at its upper end to the gimbal, and thus rotates the gimbal and mirror about the azimuth pivot axes. The mirror 20 is driven in elevation by the elevation servo motor 66, which is carried by the frame or gimbal 50 and drives a crank shaped sector gear 68 that is rigidly secured to the elevation pivot axis of the mirror. The elevation pivot axis is defined by a pair of horizontal pivot shafts, one of which is shown at 70, which are journaled in the gimbal and provide a rigid mount for the mirror 20 suitably fastened thereto. The gear 68 also drives an elevation synchro transformer 72 which is carried by the frame 50 and constitutes part of the elevation servo drive positioning system. The bottom wall of the housing 54 is slotted as shown at 74 to permit the elements 56, 58 and 60 to be positioned properly relative to the gear 62.

A predicting reticle image is produced by the lamp 18 and reticle lens 17, the side of which facing the beam splitter has the reticle pattern etched or painted thereon.

A fixed recticle assembly providing a fixed bore-sighted reticle image is provided by the lamp source 80, condensing lens 82, fixed reticle 84, fixed mirror 86 and field lens 88.

Fig. 6 illustrates a form of sight head in accordance with the present invention in which the azimuth and elevation control axes of the prediction mirror are located in the plane of the mirror. In this case the gimbal 100 completely surrounds the prediction mirror 20 and has its azimuth pivot axis defined by the vertically disposed stub pivot shafts 102, 104 which are journaled in the housing 106, as shown. The elevation and azimuth drives for the gimbal and prediction mirror are otherwise generally the same as that illustrated in Fig. 5.

The beam splitter 14 may be a polarized partial mirror suitably mounted as by clamp plates, one of which is shown at 110, which are fastened to the sides of the beam splitter and are mounted on a boss or to the side walls of the housing. A lamp housing 114 is shown fastened to the right end of the housing and contains the light source 116, condensing lens assembly 118, and reticle assembly 120. The condensing lens assembly is mounted in the hollow stem of a cylindrical holder 122 fastened to the end of the housing with the stem received in the hollow cylindrical portion of a frustro-conically shaped element 126 that is mounted in a bushing 130 in the housing, as shown. The forward end of the element 126 facing the beam splitter has a face gear formed thereon which is driven through a gear train 132 from a range servo follow-up system including a servo motor 134 and potentiometer or synchro transformer 136 in accordance with a radar range signal supplied thereto from the radar apparatus carried by the craft.

The reticle may be a multi-element assembly such as is shown in Figs. 7 and 7a including a movable range reticle plate 140 that is fastened to and carried by the rotatable element 126 and a fixed reticle plate 142 fixedly mounted on the end of the stem portion of the condensing lens holder 122. The fixed reticle 142 is apertured or formed as shown in Fig. 7 while the movable range reticle 140 is shown in Fig. 7a. The resulting reticle display projected on the combining glass 10 is illustrated in Fig. 7b, the numerical indicia 144 appearing in the arcuate slots 146 representing the range of the craft to the target as determined by the radar apparatus.

The collimator is illustrated as being composed of a crown and flint lens assembly 150, 152 mounted in a lens holder 154 received in an opening in the top of the housing. Associated with the collimator, there is provided a circular polarizer laminate assembly 158 composed of a quarter wave plate 160 and a plane polarizer 162. This arrangement functions to eliminate ghost or multiple reflections from the interior of the sight head without undue impairment of the effective reflectivity of the optical system. The laminate 158, which is mounted in the lens holder 154, is shown located below the collimator but could be mounted above the lens assembly if desired. The plane polarizer 162 may be a piece of polaroid obtainable from the Polaroid Corporation of Cambridge, Massachusetts, and has its plane of polarization in the plane of incidence of the light from the reticle or in the plane of the paper as shown in Figure 6. This reduces ghost reflections caused by the multiple reflecting surfaces of the various mirror elements within the sight head by a factor of ten to one for light in an incident plane of approximately 45°.

The quarter wave plate 160 may be a dichroic coating having two different indices of refraction 90° apart. While the introduction of the polaroid into the system reduces the light transmission through the system, the quarter wave plate circularly polarizes the plane polarized light transmitted by the polaroid plate to increase the effective reflectivity of the combining glass.

The quarter wave plate may be mounted either above or below the lens in the path of the light beam so long as it is mounted above the beam splitter and below the combining glass. The location of the plane polarizer is not critical and can be located anywhere between the reticle and the combining glass, as illustrated in Fig. 8.

The bottom wall of the housing of the sight head of Fig. 6 has an opening therein which is covered by a detachable mounting plate 168. The plate may be removed to permit attachment of an auxiliary lamp housing and fixed reticle assembly in the nature of that shown in Fig. 5, for example, to provide a fixed bore-sighted reticle image in addition to the predicting reticle image provided by the lamp source 116 and reticle assembly 120.

In place of the fixed reticle assembly, the apparatus of Fig. 6 could be integrated with a cathode ray tube 172, as illustrated diagrammatically in Fig. 8. The cathode ray tube may form part of a scanning or mapping radar, for example, which scans the terrain and projects the target terrain upon the combining glass, the effective reflectivity of which may be increased by coating the reflecting surfaces of the various optical elements in the system with dichroic coatings.

What is claimed is:

1. An optical sight head including the combination of a collimator having a primary lens node disposed in the principal plane thereof, an illuminated reticle disposed in a plane extending transversely of the principal plane of the collimator, a beam splitter having its optical surface bisecting said planes, and a prediction mirror having a reference position perpendicular to light rays from the reticle which impinge upon the center of the beam splitter, the center of said beam splitter being located equidistant from the principal plane of the collimator and the plane of the reticle and said prediction mirror being rotatable about an elevation control axis and a deflection control axis so oriented that an undeviated light ray from the illuminated reticle will be coincidentally reflected back upon itself.

2. An optical sight head including the combination of a collimator having a primary lens node disposed in the principal plane thereof, an illuminated reticle disposed in a plane extending transversely of the principal plane of the collimator, a beam splitter having its optical surface bisecting said planes, and a prediction mirror having a reference position perpendicular to light rays from the reticle which impinge upon the center of the beam splitter, the center of said beam splitter being located equidistant from the principal plane of the collimator and the plane of the reticle and said prediction mirror being rotatable about an elevation control axis and a deflection control axis so oriented that an undeviated light ray from the illuminated reticle will be coincidentally reflected back upon itself, said collimator having a focal length substantially equal to twice the sum of the distance of the reticle from the beam splitter and the distance of the predicting mirror from the center of the beam splitter.

3. An optical sight head including the combination of a collimating lens having a primary lens node, a beam splitter, an illuminated reticle and a prediction element each displaced from the beam splitter, the said beam splitter being so located relative to the principal plane of the lens containing the node thereof and the plane of the reticle that a virtual image of the lens node is superimposed upon the reticle center and said prediction mirror element being rotatable about an elevation control axis and a deflection control axis so oriented that an undeviated light ray from the illuminated reticle will be coincidentally reflected back upon itself and pass through the lens node.

4. The combination in accordance with claim 3 above wherein the said elevation control axis and said deflection control axis of said prediction mirror lie in the plane of the prediction mirror.

5. The combination in accordance with claim 3 above wherein the said elevation control axis and said deflection control axis of said prediction mirror are located behind the plane of the prediction mirror.

6. An optical sight head including the combination of a collimating lens having a primary lens node, a beam splitter located below the collimating lens, an illuminated reticle assembly displaced laterally from the beam splitter, the said beam spitter being so located relative to the principal plane of the lens containing the node thereof and the plane of the reticle that a virtual image of the lens node is superimposed upon the reticle center and said prediction element being rotatable about an elevation control axis and a deflection control axis so oriented that an undeviated light ray from the illuminated reticle will be coincidentally reflected back upon itself and pass through the lens node.

7. The combination in accordance with claim 6 above wherein said prediction mirror is displaced laterally of said beam splitter and located on the side thereof opposite the reticle assembly.

8. The combination in accordance with claim 6 above wherein said prediction mirror is located below said beam splitter and said reticle assembly and is located on the same side thereof as the reticle assembly.

9. An optical sight head including the combination of a collimating lens having a primary lens node, a partially reflecting beam splitter located directly below the collimating lens, an illuminated first reticle assembly displaced laterally from one side of the beam splitter, a predicting mirror displaced laterally from the other side of the beam splitter opposite the reticle assembly, and an illuminated second reticle assembly located directly below the beam splitter, the said beam splitter being so located relative to the principal plane of the lens node and the plane containing the reticle that a virtual image of the lens node is superimposed upon the reticle center of the first reticle assembly and conversely, the said prediction mirror being rotatable about an elevation control axis and a deflection control axis that are so oriented that an undeviated ray from the illuminated first reticle assembly will be coincidentally reflected back upon itself and will pass through the lens node.

10. An optical sight head including the combination of a collimating lens having a primary lens node, a partially reflecting beam splitter located directly below the collimating lens, an illuminated first reticle assembly displaced laterally from one side of the beam splitter, a predicting mirror located directly below the beam splitter and disposed on the same side thereof as the aforesaid reticle assembly, and an illuminated second reticle assembly displaced laterally from the other side of the beam splitter opposite the said first reticle assembly, the said beam splitter being so located relative to the principal plane of the lens node and the plane containing the reticle that a virtual image of the lens node is superimposed upon the reticle center of the first reticle assembly and conversely, the said prediction mirror being rotatable about an elevation control axis and a deflection control axis that are so oriented that an undeviated ray from the illuminated first reticle assembly will be coincidentally reflected back upon itself and will pass through the lens node.

11. An optical sight head including the combination of a collimating lens having a primary lens node, a partially reflecting beam splitter located directly below the collimating lens, an illuminated reticle assembly displaced laterally from one side of the beam splitter, a movable predicting mirror displaced laterally from the other side of the beam splitter opposite the reticle assembly, and a fixed mirror located directly below the beam splitter, the said beam splitter being so located relative to the principal plane of the lens node and the plane containing the reticle that a virtual image of the lens node is superimposed upon the reticle center of the reticle assembly and vice-versa, the same prediction mirror being rotatable about an elevation control axis and a deflection control axis that are physically oriented so that an undeviated ray from the illuminated reticle assembly will be coincidentally reflected back upon itself and will pass through the lens node.

12. The combination in accordance with claim 11 above including a color filter located between the beam splitter and the fixed mirror.

13. An optical sight head including the combination of a collimating lens having a primary lens node, a partially reflecting beam splitter located directly below the collimating lens, an illuminated reticle assembly displaced laterally from one side of the beam splitter, a movable predicting mirror displaced laterally from the other side of the beam splitter opposite the reticle assembly, a cathode ray tube and optical system producing an image directly below said beam splitter, the said beam splitter being so located relative to the principal plane of the lens node and the plane containing the reticle that a virtual image of the lens node is superimposed upon the reticle center of the reticle assembly and vice-versa, the said prediction mirror being rotatable about an elevation control axis and a deflection control axis that are physically oriented so that an undeviated ray from the illuminated reticle assembly will be coincidentally reflected back upon itself and will pass through the lens node.

References Cited in the file of this patent

UNITED STATES PATENTS

| | | |
|---|---|---|
| 2,432,613 | Fedde | Dec. 16, 1947 |
| 2,459,206 | Wheeler | Jan. 18, 1949 |
| 2,464,195 | Burley | Mar. 8, 1949 |
| 2,486,225 | Townsley | Oct. 25, 1949 |
| 2,492,888 | Robbins | Dec. 27, 1949 |
| 2,527,245 | Cunningham | Oct. 24, 1950 |